(12) United States Patent
Kodakandla et al.

(10) Patent No.: US 11,860,673 B1
(45) Date of Patent: Jan. 2, 2024

(54) DATABASE WITH CLIENT-CONTROLLED ENCRYPTION KEY

(71) Applicant: Amazon Technologies, Inc., Seattle, WA (US)

(72) Inventors: Avinash Kodakandla, Seattle, WA (US); Akshat Vig, Seattle, WA (US); Ravi Math, Redmond, WA (US); Sroaj Sosothikul, Seattle, WA (US); Nicholas Gordon, Seattle, WA (US); Somasundaram Perianayagam, Seattle, WA (US); Mazen Moez Ali, Seattle, WA (US); Sharan Rajesh Munyal, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 341 days.

(21) Appl. No.: 16/693,166

(22) Filed: Nov. 22, 2019

(51) Int. Cl.
    *G06F 16/23* (2019.01)
    *G06F 16/22* (2019.01)
    *H04L 9/08* (2006.01)
    *G06F 16/27* (2019.01)

(52) U.S. Cl.
    CPC ...... *G06F 16/2358* (2019.01); *G06F 16/2282* (2019.01); *G06F 16/2365* (2019.01); *G06F 16/27* (2019.01); *H04L 9/0822* (2013.01)

(58) Field of Classification Search
    CPC .............. G06F 16/2358; G06F 16/2282; G06F 16/2365; G06F 16/27; H04L 9/0822
    See application file for complete search history.

(56) References Cited

U.S. PATENT DOCUMENTS

| | | | |
|---|---|---|---|
| 7,111,005 B1* | 9/2006 | Wessman | H04L 9/14 707/999.009 |
| 7,596,696 B1 | 9/2009 | Perlman | |
| 10,110,383 B1 | 10/2018 | Tamilarasan et al. | |
| 10,474,632 B2 | 11/2019 | Salyers et al. | |
| 10,673,628 B1 | 6/2020 | Shtop et al. | |
| 10,956,600 B2 | 3/2021 | Ye et al. | |
| 11,190,353 B2 | 11/2021 | Connard et al. | |
| 11,258,604 B2 | 2/2022 | Vats et al. | |
| 2010/0189263 A1 | 7/2010 | Cunningham et al. | |
| 2010/0318782 A1 | 12/2010 | Auradkar et al. | |
| 2013/0246813 A1* | 9/2013 | Mori | H04L 9/008 713/193 |

(Continued)

FOREIGN PATENT DOCUMENTS

WO 2018056962 3/2018

OTHER PUBLICATIONS

Data Encryption with Customer-Managed Keys, pp. 1-8, May 11 (Year: 2017).*

(Continued)

*Primary Examiner* — Albert M Phillips, III
(74) *Attorney, Agent, or Firm* — Davis Wright Tremaine LLP

(57) ABSTRACT

A distributed database encrypts tables using table encryption keys protected by a client master encryption key. The client may revoke and subsequently restore authorization to access the client master encryption key. A sweeper process of the distributed database examines encrypted tables and identifies changes to the status of a corresponding client master encryption key. A response to an identified change in status is initiated.

20 Claims, 12 Drawing Sheets

(56) References Cited

U.S. PATENT DOCUMENTS

| | | | |
|---|---|---|---|
| 2015/0372810 A1 | 12/2015 | Miller et al. | |
| 2017/0249467 A1 | 8/2017 | Mueller et al. | |
| 2017/0262638 A1* | 9/2017 | Horowitz | H04L 9/0819 |
| 2017/0264432 A1* | 9/2017 | Horowitz | G06F 21/602 |
| 2017/0344646 A1* | 11/2017 | Antonopoulos | H04L 63/205 |
| 2018/0039781 A1 | 2/2018 | Mueller et al. | |
| 2018/0183777 A1 | 6/2018 | Guillory et al. | |
| 2019/0081799 A1 | 3/2019 | Uhr et al. | |
| 2019/0235974 A1* | 8/2019 | Pardon | G06F 11/2094 |
| 2019/0318102 A1* | 10/2019 | Araya | H04L 63/20 |
| 2021/0351939 A1 | 11/2021 | Wang et al. | |

OTHER PUBLICATIONS

AWS Key Management Service Best Practices, pp. 1-24, April (Year: 2017).*
Monitoring Customer Master Keys, pp. 1-4. (Year: 2017).*
EventBus tutorial with examples, pp. 1-3, (Year: 2017).*
Tomar, An Overview of Distributed Databases, pp. 207-214 (Year: 2014).*

* cited by examiner

DATABASE WITH CLIENT-CONTROLLED ENCRYPTION KEY

CROSS-REFERENCE TO RELATED APPLICATIONS

This application incorporates by reference for all purposes the full disclosures of co-pending U.S. patent application Ser. No. 16/693,164, filed concurrently herewith, entitled "DATABASE WITH CLIENT-CONTROLLED ENCRYPTION KEY" and co-pending U.S. patent application Ser. No. 16/693,167, filed concurrently herewith, entitled "DATABASE WITH CLIENT-CONTROLLED ENCRYPTION KEY."

BACKGROUND

Increasingly, data encryption is used in a variety of applications. Encryption makes it much more difficult for a malicious actor to steal sensitive information, and protects the privacy and security of the data's owner. Data encryption is typically employed in transit. In addition, encryption of data at rest has become more common. However, the operation or efficiency of databases that maintain encrypted data may be improved. The operation or efficiency of managed databases, in which a provider manages a database on behalf of a client, may be particularly challenging, especially where the client maintains control over certain encryption keys.

BRIEF DESCRIPTION OF THE DRAWINGS

Various techniques will be described with reference to the drawings, in which.

DETAILED DESCRIPTION

Figure 1:
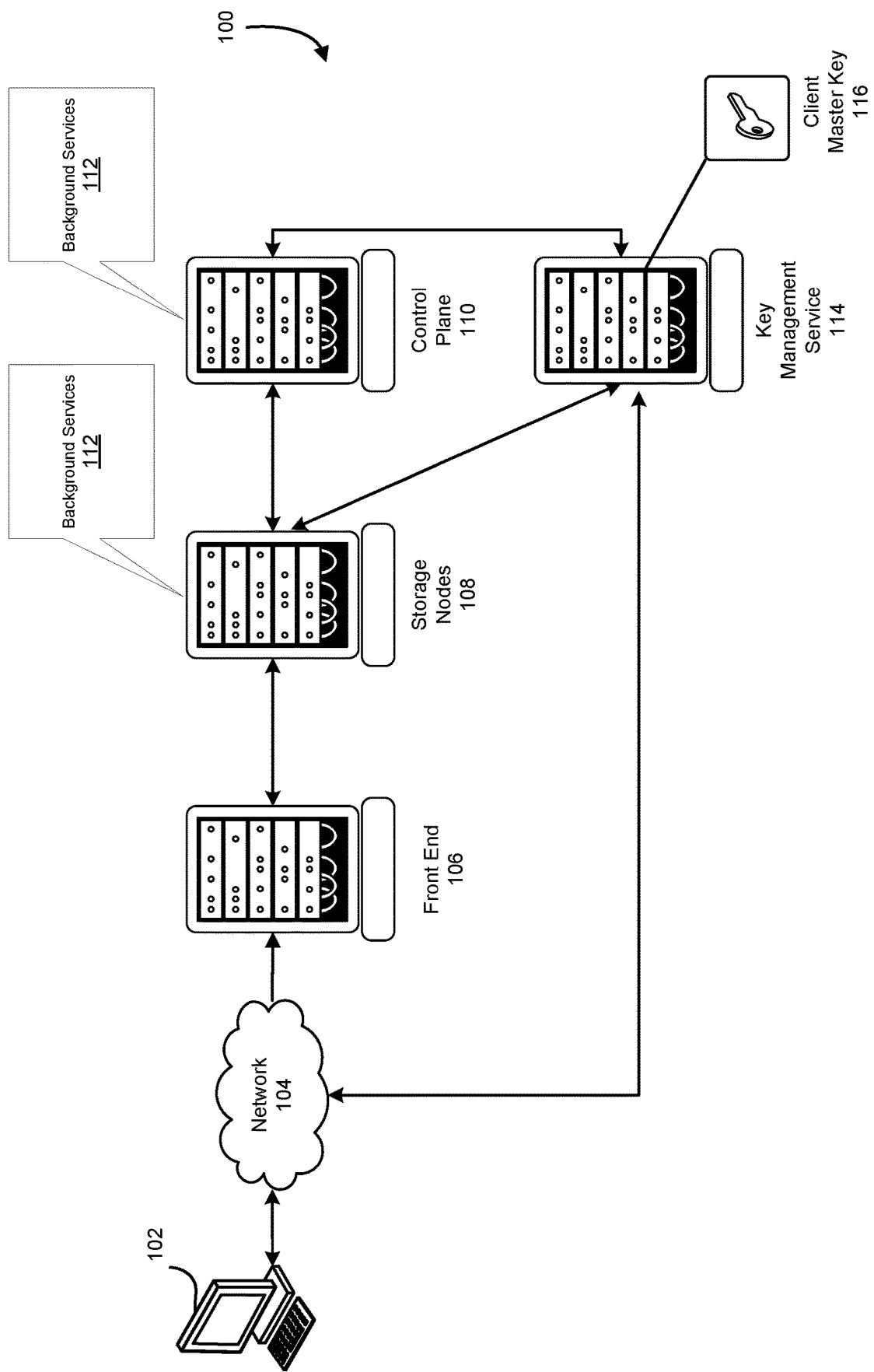
FIG. 1 illustrates an example of a distributed database, in accordance with at least one embodiment.

In an example of a distributed database system, a table is stored in an encrypted format, using a hierarchy of encryption keys. The root of the hierarchy of encryption keys may be referred to, in the example, as a client master encryption key. The client master encryption key is controlled by a client of the distributed database system. Authorization to use the client master encryption key can be granted, and subsequently revoked, by the client.

In this example, the table is stored using a table encryption key that descends from the client master encryption key in the hierarchy. Certain maintenance operations pertaining to the table, such as snapshot operations, are performed using a descendent of the table's encryption key. Other operations, such as those related to generating backups intended for long-term storage, are generated using a direct descendent of the client master encryption key.

In this example, the distributed database comprises a plurality of storage nodes, which may also be referred to herein as nodes. A storage node may maintain some or all of a version of the encrypted table. For example, a given storage node might maintain a partition of the encrypted table, or might maintain the entire table. Each of the storage nodes, or rather, each storage node involved in maintaining the particular table, may also store a copy of the corresponding table encryption key. Access to the table is done by using the table encryption key to decrypt the table's data. To protect the table encryption key, it is kept in a secure memory facility included within each storage node.

In this example, the distributed database further comprises various processes and components for detecting changes to the status of a client master encryption key. In this example, a sweeper process examines each encrypted table and identifies the status of the associated client master client encryption keys. Other mechanisms, such as an event bus and direct status notifications, are also used to identify changes to the status of a client master encryption key. When access is revoked, a notification process is initiated to inform the table's owner of the issue, and a deactivation process for the table is initiated after a predetermined period of time has elapsed. A backup of the table is generated prior to deactivating the table.

The various aspects of the example just described convey a number of benefits to the operation and efficiency of the distributed database, particularly when access to the client master encryption key is revoked. For example, to may be beneficial, in such circumstances, to maintain guarantees regarding the durability and availability of data. In this example, storage and replication of the encrypted data and the associated table encryption key ensures that the encrypted data, and the encryption key needed to access the data, remain available even if a storage node fails during a period in which access to the client master encryption key has been revoked. These aspects also provides for continuity of operations for a period of time after the revocation of access to the client master encryption key. Further, the disclosed aspects allow for the continued operation of various background services, such as background services generated table snapshots and backups.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including those related to the storage and retrieval of configuration information. In particular, the technical field of database management systems is improved by the provision of techniques, embodiments of which are described herein, for securing data using a customer-managed encryption key.

FIG. 1 illustrates an example of a distributed database, in accordance with at least one embodiment. In particular, FIG. 1 illustrates an example of a distributed database 100 comprising a front end 106, storage nodes 108, and a control plane 110. The distributed database 100 stores data and provides access to stored data on behalf of a client 102. The data is stored in an encrypted form, using cryptographic keys accessed via a key management service 114. The key management service 114 stores and provides access to a client master encryption key 116. An entity associated with the client 102 controls access to the client master encryption key (which may also be referred to herein as a master encryption key), and may grant, revoke, or suspend access to the client master encryption key 116. Communication between the client 102 and components of the distributed database system, such as front end 106 or key management service 114, may be performed via a network 104.

In addition to performing data storage and data access operations on behalf of the client 102, the distributed database 100 may also execute various background services 112. A background service may also be referred to herein as a background process. Examples of background services 112 include, but are not necessarily limited to, snapshot operations, backup operations, replication operations, data aggregation operations, and so forth. It will be appreciated that these examples are intended to be illustrative rather than limiting, and that as such should not be construed in a manner which would limit the scope of the present disclosure to only those embodiments which include the specific examples provided. Many of the background services 112 may involve operations that access data that has been encrypted using the client master encryption key 116.

The client 102 may comprise a computing device with at least one processor and a memory to store processor-executable instructions. Examples of such computing devices include, but are not limited to, personal computers, smartphones, tables, internet-of-things devices, and so forth. It will be appreciated that these examples are intended to be illustrative rather than limiting, and that as such should not be construed in a manner which would limit the scope of the present disclosure to only those embodiments which include the specific examples provided.

The client 102 may exercise control over the client master encryption key 116. This control may comprises creating the client master encryption key 116, granting the distributed database 100 authorization to access the client master encryption key 116, and suspending or revoking said access. The distributed database 100 may detect and respond to these events through various techniques, described herein, to maintain continuity of access to the encrypted data for at least a period of time after the suspension or revocation of the authorization.

Figure 2:
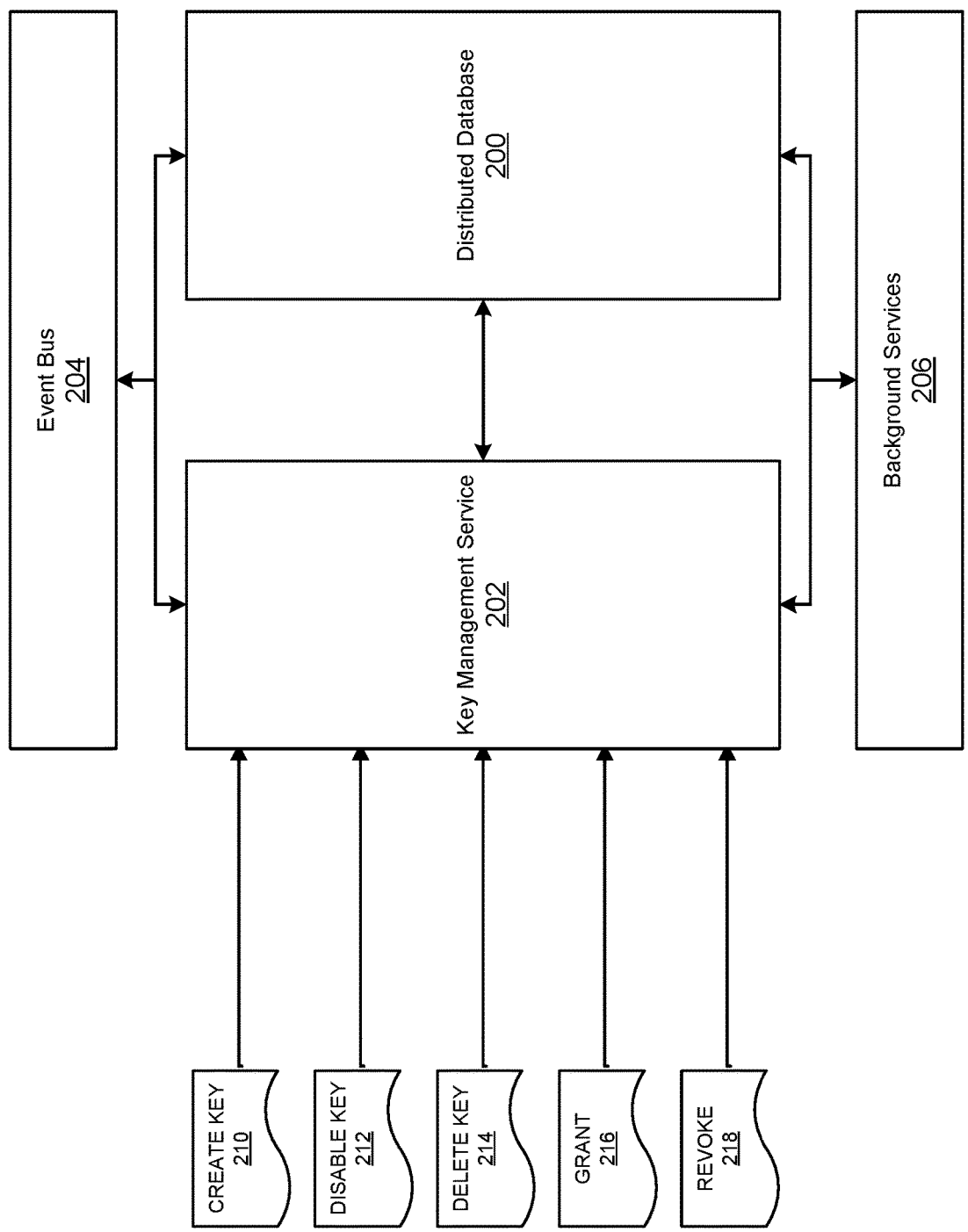
FIG. 2 illustrates an example of communication between a key management service and a distributed database system, in accordance with at least one embodiment.

FIG. 2 illustrates an example of communication between a key management service and a distributed database system, in accordance with at least one embodiment. In the example of FIG. 2, a distributed database 200 obtains, from a key management service 202, information pertaining to customer-managed encryption keys. The distributed database 200 and key management service 202 of FIG. 2 may correspond to the distributed database and the key management service that are depicted in FIG. 1.

FIG. 2 illustrates a number of examples concerning management actions that may be taken by a client, such as the client depicted in FIG. 1, with respect to a customer-managed key, such as the client master encryption key depicted in FIG. 1. These include CREATE KEY 210, DISABLE KEY 212, DELETE KEY 214, GRANT 216, and REVOKE 218 operations. It will be appreciated that these examples are intended to be illustrative rather than limiting, and that as such should not be construed in a manner which would limit the scope of the present disclosure to only those embodiments which include the specific examples provided.

In at least one embodiment, the distributed database 200 obtains information about a change to the status of a client master encryption key from one or more sources. These sources may include the key management service 202, an event bus 204, and background services 206. Moreover, information about a change to the status of a client master encryption key may be obtained through general database operations, such as operations related to storage, retrieval, and maintenance, when these operations involve access to the client master encryption key.

In at least one embodiment, the distributed database obtains notifications from the key management service 202 by direct interaction with the service. This may include the distributed database invoking one or more functions of an application programming interface ("API") that is implemented by the key management service 202. For example, the key management service 202 may include an API to allow the distributed database 200 to obtain a status indicator pertaining to a given client master encryption key. The key management service 202 may also include an API allowing the distributed database 200 to use a client master encryption key to perform an operation. The key management service 202 may be implemented on any suitable computing system, or combination of systems, such as those depicted in FIG. 12.

In at least one embodiment, an event bus 204 implements a publish-and-subscribe model for events pertaining to the status of master client keys. For example, in at least one embodiment, the distributed database 200 subscribes to events pertaining to master client keys used with encrypted tables maintained by the distributed database 200. The key management service 202 publishes status information to the event bus 204, and the database 200 then receives notification pertaining to the keys whose events is has subscribed to. The event bus 204 may be implemented on any suitable computing system, or combination of systems, such as those depicted in FIG. 12.

In at least one embodiment, the background services 206 correspond to the background services depicted in FIG. 1. During the course of their operation, these services may interact with the key management service 202 to perform various functions which may involve a client master encryption key. These interactions may generally require appropriate authorization to access a client master encryption key, or to access a descendent key in a hierarchy of encryption keys with the client master encryption key at its root. As such, these interactions may fail if the authorization has been suspended or revoked. The background service 206 may respond to such failures by, at least, notifying the distributed database 200 of the failure. Similarly, they might publish an event pertaining to the status change to the event bus 204.

Figure 3:
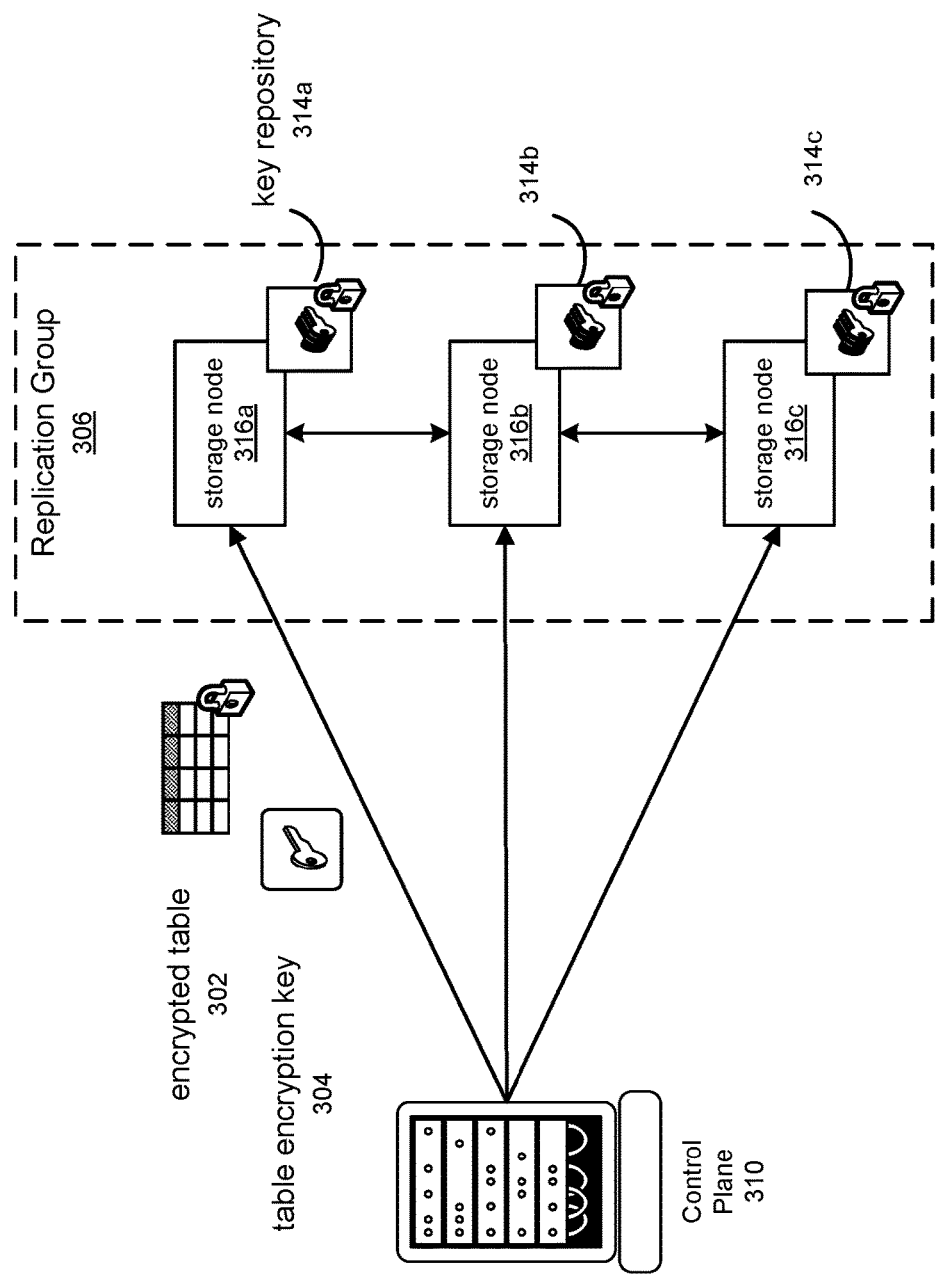
FIG. 3 illustrates an example of a distributed database maintaining an encrypted table, in accordance with at least one embodiment.

FIG. 3 illustrates an example of a distributed database managing an encrypted table, in accordance with at least one embodiment. In the example of FIG. 3, a distributed database 300 comprises a control plane 310 and a replication group 306. The distributed database 300 and control plane 310 may correspond to the distributed database and control plane that are depicted in FIG. 1.

In at least one embodiment, a number of storage nodes 316a-c, which may correspond to the storage nodes depicted in FIG. 1, form a replication group 306. The replication group 306 comprises a set of storage nodes that participate in the maintenance of a collection of data. In the example of FIG. 3, the replication group 306 maintains an encrypted table 302. In at least one embodiment, each of the storage nodes 316a-c maintain its own copy of the encrypted table 302. In another at least one embodiment, each of the storage nodes 316a-c maintains a partition of the encrypted table 302.

In at least one embodiment, the encrypted table 302 is encrypted using an encryption key associated with, and accessible by, a table encryption key 304. For example, the data in the encrypted table 302 can be encrypted using the table encryption key 304, by using an encryption key that is accessed by or generated using the table encryption key 304. Likewise, the table encryption key 304 may be accessed by or generated using a client master encryption key controlled by the table's owner.

For example, in at least one embodiment, a client sends the distributed database 300 a command to create a database table. The command specifies that the table be encrypted, and specifies or otherwise indicates a master client key.

In at least one embodiment, a control plane 310 responses to the command by creating a table encryption key 304 and sending it to a storage node 316a, where it is stored in a key repository 314a. The table encryption key 304 is accessed by or generated using the master client key.

In at least one embodiment, a key repository, such as the depicted key repositories 314a-c, comprises a secure storage mechanism on a storage node. For example, some operating systems include secure storage mechanisms, such as key rings or key repositories. Another example is a hardware security module ("HSM"), in which encryption keys can be securely stored. An HSM may also be accessed via the storage node's operating system.

The control plane 310 may also cause the storage node 316a to generate and store encrypted table 302. The table's data is encrypted with a key that is accessed by or generated from the table key, or using the table key itself. The control plane 310 or storage node 316a may require authorization to access to the client master encryption key when the table encryption key 304 is first created, but may continue to utilize the table encryption key 304 for some period of time after access to the client master encryption key has been revoked or suspended.

The encrypted table 302 and table encryption key 304 may, in at least one embodiment, be replicated to other storage nodes 316b-c. In at least one embodiment, at least two other nodes are involved in the replication. Each of these storage nodes 316b-c stores the table encryption key 304 in a secure key-repository 314b-c.

Figure 4:
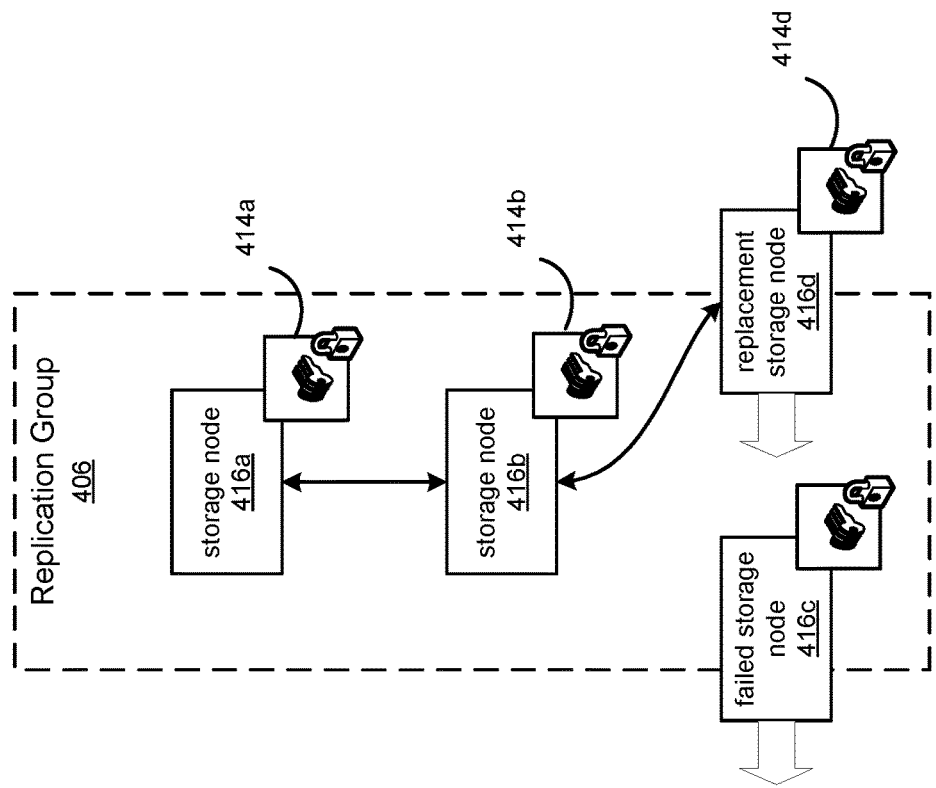
FIG. 4 illustrates an example of a distributed database recovering from a storage node failure, in accordance with at least one embodiment.

FIG. 4 illustrates an example of a distributed database recovering from a storage node failure, in accordance with at least one embodiment. In FIG. 4, an example distributed database 400 may comprise storage nodes 416a-c, making up a replication group 406. These may correspond to the storage nodes and replication groups depicted in FIGS. 1, 2, and 3, for example.

As described in relation to FIG. 3, a table encryption key for an encrypted table may be replicated between members of a replication group. In an event of a storage node failure, copies of the table encryption key that are stored on the still-functioning nodes may be used to bring a new storage node online. For example, as depicted in FIG. 4, a storage node 416c may fail. It may then be replaced by a replacement storage node 416d. A copy of the table encryption key may then be replicated from either of the two original storage nodes 416a-b, and stored in the key repository 414d of the replacement storage node 416d. Data for the encrypted table may also be replicated to the replacement node, and may become accessible using the replicated table encryption key.

Figure 5:
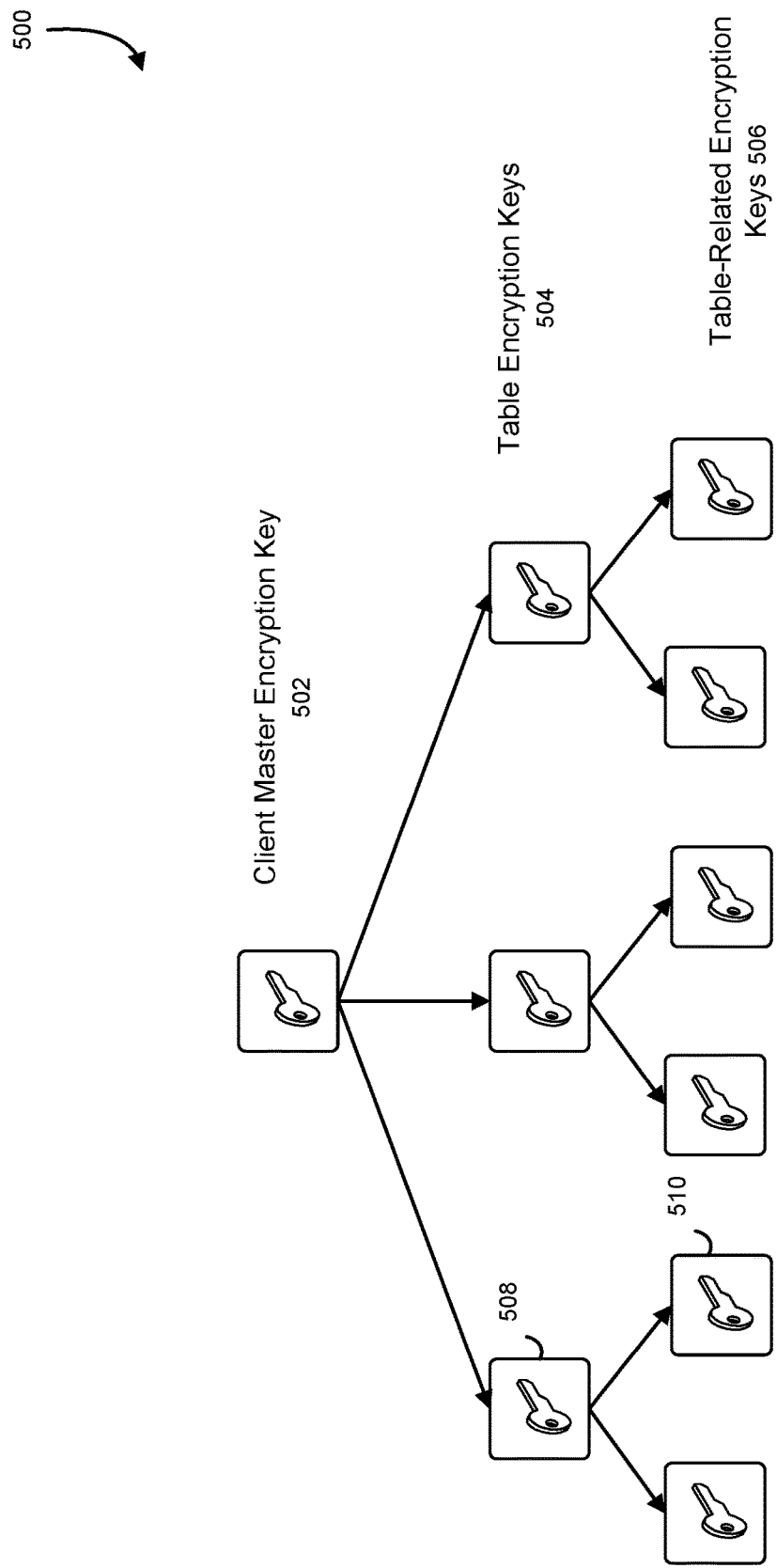
FIG. 5 illustrates an example of a hierarchy of encryption keys, in accordance with at least one embodiment.

FIG. 5 illustrates an example of a hierarchy of encryption keys, in accordance with at least one embodiment. In the example of FIG. 5, a client master encryption key 502 is at the root of an encryption key hierarchy 500. In at least one embodiment, the client master encryption key 502 is managed by a key management service, such as the one depicted in FIG. 2, on behalf of a client. The client, which may correspond to the client depicted in FIG. 1, may request that the key management service create the client master encryption key 502 and grant a distributed database, such as the distributed database depicted in FIG. 1, with access to the key.

In at least one embodiment, to store an encrypted table, the distributed database generates a table encryption key, such as one of the table encryption keys 504 depicted in FIG. 5, and encrypts it using the client master encryption key 502. For example, a table encryption key 508 may be generated and encrypted with the client master encryption key 502. The table encryption key 508 may then be used to perform various cryptographic operations related to the management of the corresponding table. These operations may include, for example, encrypting the table's contents, encrypting the table's schema, encrypting other metadata related to the table, and so forth. It will be appreciated that these examples are intended to be illustrative rather than limiting, and that as such should not be construed in a manner which would limit the scope of the present disclosure to only those embodiments which include the specific examples provided.

In at least one embodiment, these cryptographic operations on a table are performed using an additional cryptographic key, such as one of the additional table-related encryption keys 506 depicted in FIG. 5, rather than directly using a table encryption key directly. For example, to perform operations such as encrypting the table's contents, encrypting the table's schema, encrypting other metadata related to the table, and so forth, a distributed database may use a table-related encryption key 510 rather than using a corresponding table encryption keys 504 directly. The table-related encryption key 510 may be generated and encrypted using the table encryption key 504.

Although FIG. 5 depicts only three levels of the encryption key hierarchy 500, there may, in at least one embodiment, be further levels. For example, an encryption key may be generated and encrypted using the table-related encryption key 510, and this encryption key may in turn be used with additional encryption keys to make additional levels of the hierarchy.

Usage of an encryption key hierarchy, with the client master encryption key 502 at the root, enables the owner of the client master encryption key 502 to exert control over access and usage of the keys in the hierarchy 500. In at least one embodiment, each level of the hierarchy, with the exception of the root, is encrypted in successive layers by its parent keys. For example, the table-related encryption key 510 is encrypted by both the table encryption key 508 and the client master encryption key 502. Consequently, access to the table-related encryption key 510 would generally require also having access to the table encryption key 508 and the client master encryption key 502.

Figure 6:
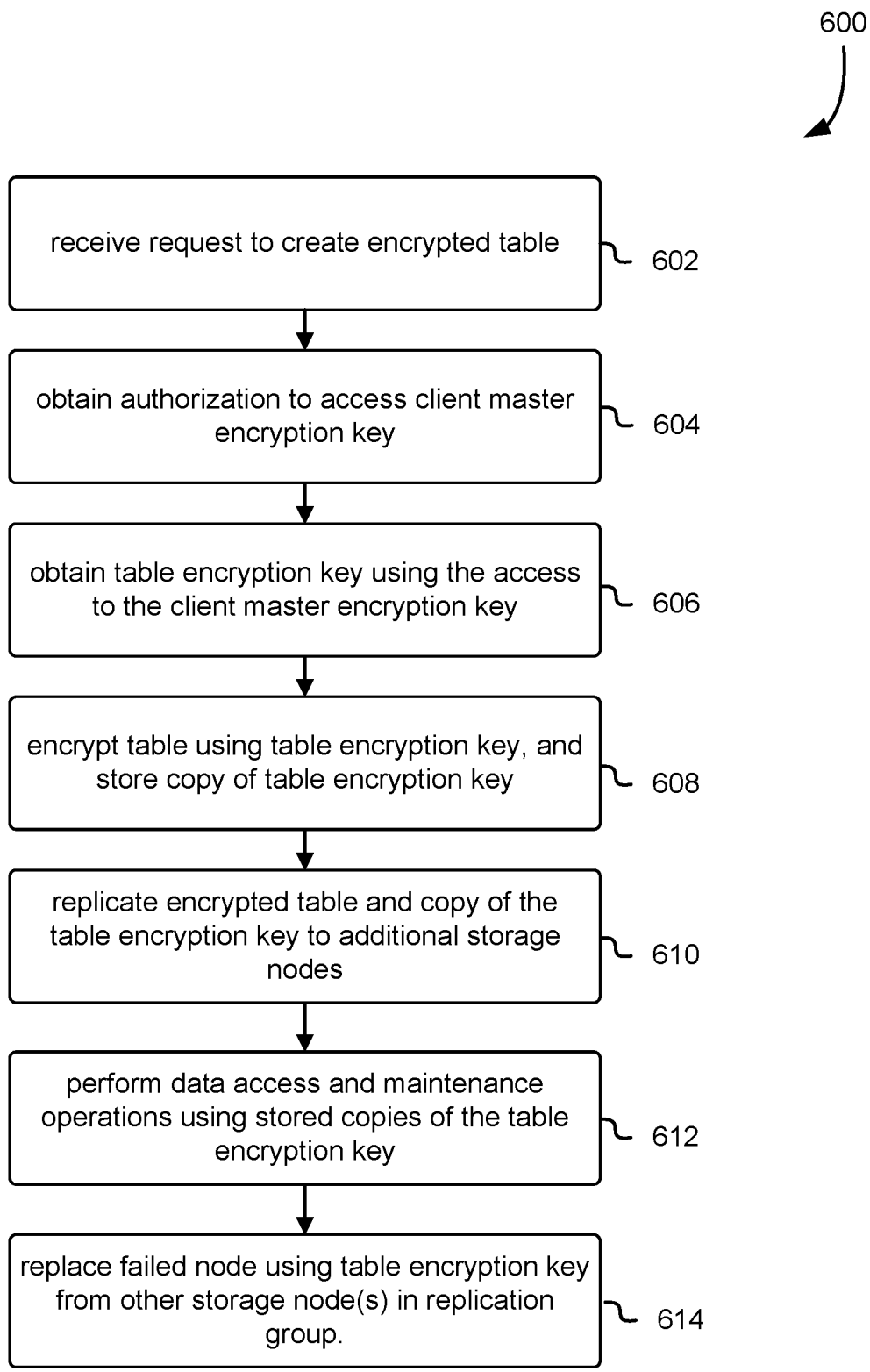
FIG. 6 illustrates an example process of utilizing a hierarchy of encryption keys in a distributed database, in accordance with at least one embodiment.

FIG. 6 illustrates an example process of utilizing a hierarchy of encryption keys in a distributed database, in accordance with at least one embodiment. The example process 600 may be performed by any suitable computing system or combination of systems, including for example the distributed databases depicted in FIGS. 1 and 12.

Although FIG. 6 is depicted as a series of steps or operations, the depicted sequence should not be viewed as limiting the scope of the present disclosure to only those embodiments that conform to the depicted sequence. For example, in various embodiments, the depicted steps or operations may be altered, reordered, or omitted, except where explicitly stated or where logically required, such as when an input to one step or operation is obtained from an output of another step or operation.

At 602, the distributed database receives a request to create an encrypted table. Alternatively, the distributed database receives a request to encrypt an existing table.

At 604, the distributed database obtains authorization to access a client master encryption key. The client master encryption key may be one owned or authorized for use by the owner or administrator of the database table.

At 606, the distributed database obtains a table encryption key to use in conjunction with storing and maintaining the encrypted table. The table encryption key may be obtained using the authorized access to the client master encryption key. For example, the key management service might generate the table encryption key and provide access to it based on the distributed database's authorization to use the client master encryption key.

At 608, the distributed database encrypts the table using the table encryption key, or a derivative key, and stores the encrypted table and a copy of the table encryption key on a storage node. The table encryption key may be stored in a secure memory of the storage node, such as in a keyring or HSM.

At 610, the distributed database replicates the encrypted table and copies of the table encryption key to additional storage nodes. In at least one embodiment, the replication occurs between three storage nodes. In at least one embodiment, more than three storage nodes are used.

At 612, the distributed database uses the stored copies of the table encryption key to perform data access and maintenance operations. The storage nodes may each perform operations using their respective copies of the table encryption key.

At 614, a failed storage node is replaced, using a table encryption key from one of the remaining storage nodes. For example, data for the encrypted table may be replicated to a replacement storage node, but a corresponding table encryption key is needed in order to access the data. The replacement node can, therefore, obtain a copy of the encryption key from one of the other storage nodes in the replication group.

Figure 7:
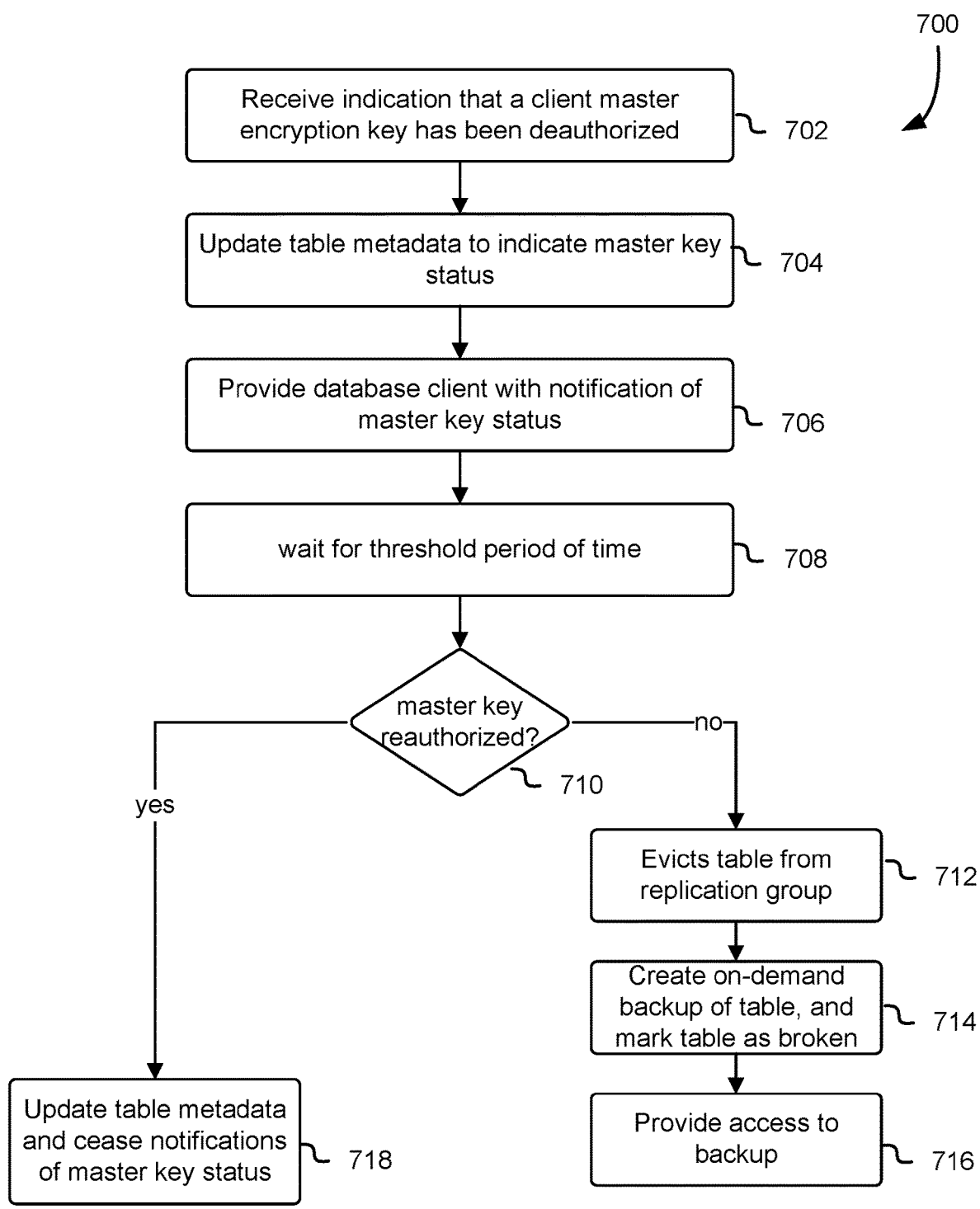
FIG. 7 illustrates an example process of adapting to revocation of authorization to access a client master encryption key, in accordance with at least one embodiment.

FIG. 7 illustrates an example process of adapting to revocation of authorization to access a client master encryption key, in accordance with at least one embodiment. The example process 700 may be performed by any suitable computing system or combination of systems, including for example the distributed databases depicted in FIGS. 1 and 12.

Although FIG. 7 is depicted as a series of steps or operations, the depicted sequence should not be viewed as limiting the scope of the present disclosure to only those embodiments that conform to the depicted sequence. For example, in various embodiments, the depicted steps or operations may be altered, reordered, or omitted, except where explicitly stated or where logically required, such as when an input to one step or operation is obtained from an output of another step or operation.

At 702, the distributed database receives an indication that access to a client master encryption key has been deauthorized. In at least one embodiment, the notification is received through one or more of a notification from a key management service, a message from an event bus, or a notification from one or more background services. In at least one embodiment, these correspond to the key management service, event bus, and background services depicted in FIG. 2.

At 704, the distributed database updates table metadata to indicate the change to the status of the client master encryption key. The distributed database will typically, for example, maintain and track metadata describing each table it maintains. This information may include the identity and corresponding status of master client encryption keys. The metadata may further comprise information indicating who should be notified in the event of a status change to a client master encryption key associated with a given table.

At 706, the distributed database provides the client, or an associated entity, with notification of the change in status of the client master encryption key. This may comprise one or more of a variety of notification operations.

In at least one embodiment, the distributed database updates a client console with information indicative of the revocation status of the client master encryption key. The client console, in at least one embodiment, is a web-based user interface, implemented using any suitable architecture, such as the one described in FIG. 12. The client console may include user interface elements for display operational status information for a particular table. This information may include visual, textual, or auditory information descriptive of the revocation status of the client master encryption key. For example, the user interface might display, in proximity to other information pertaining to a table, an icon indicating the revocation status. The icon might convey, for example, that access to the client master encryption key used in association with the table has been suspended or revoked, that the client master encryption key has expired, and so on.

In at least one embodiment, the distributed database provides a notification of the change in status by generating an email, text message, phone message, or other message that is directed to a recipient associated with the owner of the table.

At 708, the distributed database waits for a threshold period of time before taking actions to begin deactivating the encrypted table. For example, in at least one embodiment, a seven-day period elapses. It will be appreciated, however, that this example is intended to be illustrative rather than limiting, and as such should not be construed in a manner which would limit the scope of the present disclosure to only those embodiments that include the specific example provided.

At 710, the distributed database determines whether access to the master client encryption key has been reauthorized. The determination may be made throughout or at any time during the waiting period described in 708, or at the end of the waiting period. At 710, the distributed database determines whether or not the client master encryption key has been reactivated. As described in relation to FIG. 2, there may be cases in which authorization to access the client master encryption key is temporarily suspended, and subsequently restored. The distributed database may therefore monitor for events, using techniques described in relation to FIG. 2, to detect when and if the authorization is restored, or to detect whether the revocation has been made permanent.

At 712, if the waiting period has elapsed without reactivation of authorization to access the master client encryption key, the distributed database evicts the table from a replication group. This may occur after some threshold period of time has elapsed since the change to the client master encrypt key's revocation status. In at least one embodiment, the table is also deactivated, so that data cannot be inserted, updated, or deleted from the table while it is deactivated. The table may be reactivated if access to the client master encryption key is restored.

At 714, the distributed database creates an on-demand backup of the table, and then marks the table as deactivated or "broken." In at least one embodiment, the on-demand backup is initiated by a control plane, such as the control plane depicted in FIG. 1. The control plane may instruct one or more of the storage nodes to create the backup by sending the storage nodes an electronic communication. The control plane may obtain a backup encryption key to use with the backup, and encrypt it using the client master encryption key. The use of the client master encryption key may be based on the obtainment of a temporary extension for accessing the client master encryption key, or by creating obtaining the backup encryption key prior to the revocation, in anticipation of the event. Thus, the encrypted backup key can be decrypted by the client if needed, and in turn the encrypted backup key can be used to access the data contained within the backup. In embodiments, the backup is accessible for a considerable period following deactivation, or indefinitely. For example, a backup may be made accessible for a one year period following revocation of authorization to access the client master encryption key, or deactivation of the table. Moreover, a backup may be provided to the client and decrypted by the client at any subsequent time, provide the client retains access to the client master encryption key.

At, the distributed database, at 716 provides the client with access to the backup of the table. Note that the backup is generated using a backup key encrypted using the client master encryption key directly, rather than through the corresponding table encryption key. In this way, the client is able to access the backup encryption key using its own retained copy of the client master encryption key. The table may also be deactivated or deleted at this stage, with access to the backup provided to ensure the client's ability to provide continued access to the data.

If the client master encryption key has been reactivated, the distributed database, at 718, updates table metadata to indicate the change in status and ceases notifying the client of the revocation status. For example, any period notifications of a negative revocation status might be ended once authorization to access the client master encryption key has been restored.

Figure 8:
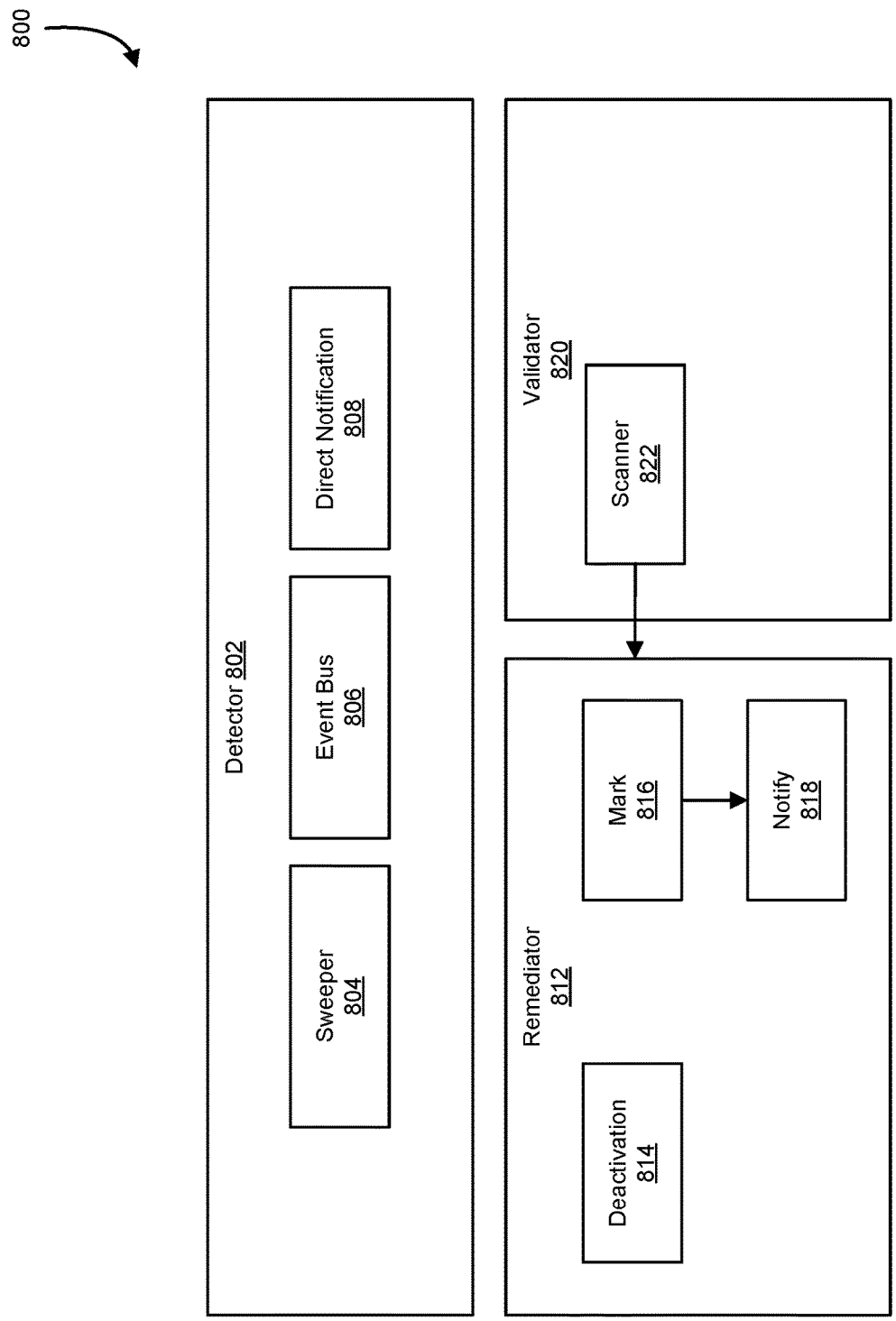
FIG. 8 illustrates an example of distributed database processes for detecting and responding to status changes of an authorization to access a client master encryption key, in accordance with at least one embodiment.

FIG. 8 illustrates an example of distributed database processes for detecting and responding to status changes of an authorization to access a client master encryption key, in accordance with at least one embodiment.

In the example of FIG. 8, aspects of a distributed database 800 comprise a detector 802, remediator 812, and validator 820. These aspects may each comprise one or more modules, such as a software module comprising processor-executable instructions loaded into at least one non-transitory memory. These aspect may also comprise one or more sub-modules, on separate computing or other logic-devices, interconnected by one or more networks or communications busses. In at least one embodiment, a control plane, such as the control plane depicted in FIG. 1, comprises some or all of the depicted modules, and performs some or all of the depicted functions.

In at least one embodiment, the detector 802 identifies changes to the status of a client master encryption key. The detector 802 may, for example, perform the detection functions described in relation to FIG. 2. For example, the detector 802 may comprise a sweeper 804 module for identifying, for each encrypted table, whether or not it's corresponding client master encryption key remains usable. This may be done, for example, by examining metadata maintained by the distributed database to identify encrypted tables and their corresponding master client encryption keys, and by interacting with a key management service to obtain status information for those keys. For example, the sweeper might iteratively examine each encrypted table maintained by the distributed database. For each encrypted table, the sweeper 804 might validate that the database still has authority to use the client master encryption key associated with a table. It might do so by calling an API of the key management service, for example.

In at least one embodiment, the detector 802 further comprises an event bus 806 module for receiving events from an event bus, and identifying the client master encryption key and encrypted table to which the received events correspond.

In at least one embodiment, the direct notification 808 module receives key status notifications from various background services, such as those depicted in FIG. 1. For example, a table creation background service might detect that it does not have the requisite authority to access a client master encryption key, and send an inter-process communication to the direct notification 808 module.

The detector 802 module, in response to detecting a change in status by one or more of the sweeper 804, event bus 806, and direct notification 808 modules, may initiate adaptive or corrective action by a remediator 812 module.

The remediator 812 module, in at least one embodiment, performs actions to respond to detected changes to the status of a table's client master encryption key.

In some cases and embodiments, authorization to access a client master encryption key is revoked or suspended. This may be described as a negative change to the key's revocation status, or as a negative change to the key's access status. In response to a negative change, an initial action may be to mark the corresponding table as having a corresponding negative status, such as "key access revoked," "key access suspended," "deactivation pending," and so forth, individually or in various combinations. The updates to the table's metadata may be performed, in some embodiments, by a mark 816 module. The remediator 812 may also notify parties and entities involved in managing the table. The remediator 812 may also cause the table to suspended or deleted, via a deactivation 814 module. Notifications, such as direct communications, may be performed via a notify 818 module.

In some cases and embodiments, authorization to access a client master encryption key is restored. This may be described as a positive change to the key's revocation status, or as a positive change to the key's access status.

In at least one embodiment, the validator 820 module comprises a scanner 822 module which periodically rechecks the status of tables whose associated key status is currently negative. The scanner module, for a given client master encryption key previously detected as revoked, may recheck with the key management service to determine if the key has been re-enabled.

Figure 9:
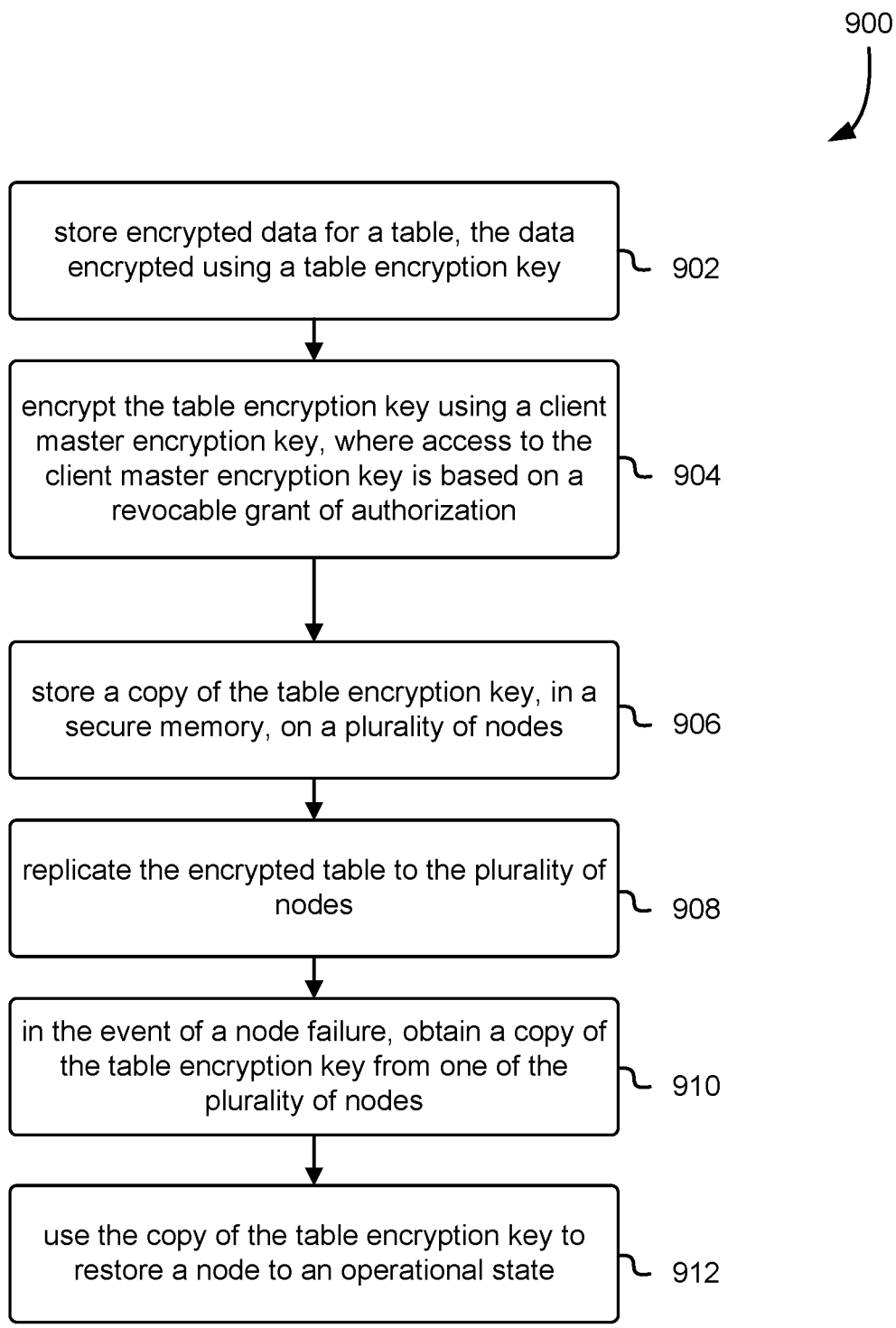
FIG. 9 illustrates an example process of encrypted table replication in a distributed database, in accordance with at least one embodiment.

FIG. 9 illustrates an example process of encrypted table replication in a distributed database, in accordance with at least one embodiment. The example process 900 may be performed by any suitable computing system or combination of systems, including for example the distributed databases depicted in FIGS. 1 and 12.

Although FIG. 9 is depicted as a series of steps or operations, the depicted sequence should not be viewed as limiting the scope of the present disclosure to only those embodiments that conform to the depicted sequence. For example, in various embodiments, the depicted steps or operations may be altered, reordered, or omitted, except where explicitly stated or where logically required, such as when an input to one step or operation is obtained from an output of another step or operation.

At 902, the distributed database stores encrypted data for a table, where the data encrypted is using a table encryption key. In at least one embodiment, the data refers to the contents of the rows or columns of a table of data. In at least one embodiment, the data refers to a collection of data, such as a collection of key-item or key-value pairs.

At 904, the distributed database encrypts the table encryption key using a client master encryption key, where access to the client master encryption key is based on a revocable grant of authorization. This encrypted version of the table encryption key can be used by any portion of the database while authorization to access the client master encryption key is maintained, since the encrypted version of the table encryption key can be decrypted with the client master encryption key.

At 906, the distributed database stores a copy of the table encryption key, in a secure memory, on a plurality of nodes. In at least one embodiment, the copy of the table encryption key that is stored such that it is accessible without access to the client master encryption key. The copy of the table encryption key that is stored may be described as unencrypted, but is this context, unencrypted refers to encryption by the client master encryption key. The table encryption key may be stored in an encrypted form, e.g., using encryption imposed by the secure memory.

At 908, the distributed database replicates the encrypted table to the plurality of nodes. This may occur, for example, by a master storage node of a replication group sharing log data with other nodes in the group. The replicated data may be transmitted in encrypted form. In at least one embodiment, the table encryption key is used to encrypt the log data. In at least one embodiment, log data is stored using a log encryption key that is encrypted by the table encryption key. In at least one embodiment, log data is stored using a log encryption key that is encrypted by the client master encryption key.

At 910, the distributed database, in the event of a node failure, obtains a copy of the table encryption key from one of the plurality of nodes. After the failure of a storage node, a component of the distributed database, such as a control plane, may cause a replacement node to be brought online. The control plane may assign the replacement node to the replication group, whose other nodes retain a copy of the table encryption key in their respective secure memories. One of these nodes can provide the copy of the table encryption key to the replacement node. The replacement node is then able to access snapshot and table replication data that has been encrypted using the table encryption key. Thus, at 912, the distributed databases uses the copy of the table encryption key to restore a node to an operational state.

In at least one embodiment, the master encryption key used in the example process of FIG. 9 is provided by a key management service.

In at least one embodiment, the distributed database described in the example process of FIG. 9 provides access to the encrypted table after revocation of the authorization to access the master encryption key. The access is provided by using the stored copy of the table encryption key to decrypt the table's data as needed by the database to process a query or command, and to re-encrypt data for transmission.

In at least one embodiment, the table's replication is suspended in response to elapsing of a threshold amount of time subsequent to the revocation of the authorization to access the client master encryption key. Thus, at some time after authorization to use the client master encryption key has been suspended, the distributed database begins to take steps to perform an orderly deactivation of the table. This may further include generating a backup of the table after the elapsing of another threshold amount of time subsequent to the revocation. The backup may be encrypted using an additional encryption key that is encrypted with the client master encryption key. This is done to ensure that the client will be able to utilize the backup at a later time, since the client may retain access to the client master encryption key even after it, and any keys encrypted by it, are no longer being utilized by the distributed database.

In at least one embodiment, the distributed database described in relation to the example process of FIG. 9 receives a notification indicative of using a new client master encryption key to replace the original client master encryption key. To utilize the new key, the table encryption key can be retrieved from the secure memory and re-encrypted using the new client master encryption key. In at least one embodiment, when a new client master encryption key is received, it is used to encrypt a chain of encryption keys comprising the existing table encryption key. This approach retains the usability of data encrypted using the table encryption key, or data encrypted using a descendent of the table encryption key in an encryption key hierarchy.

Figure 10:
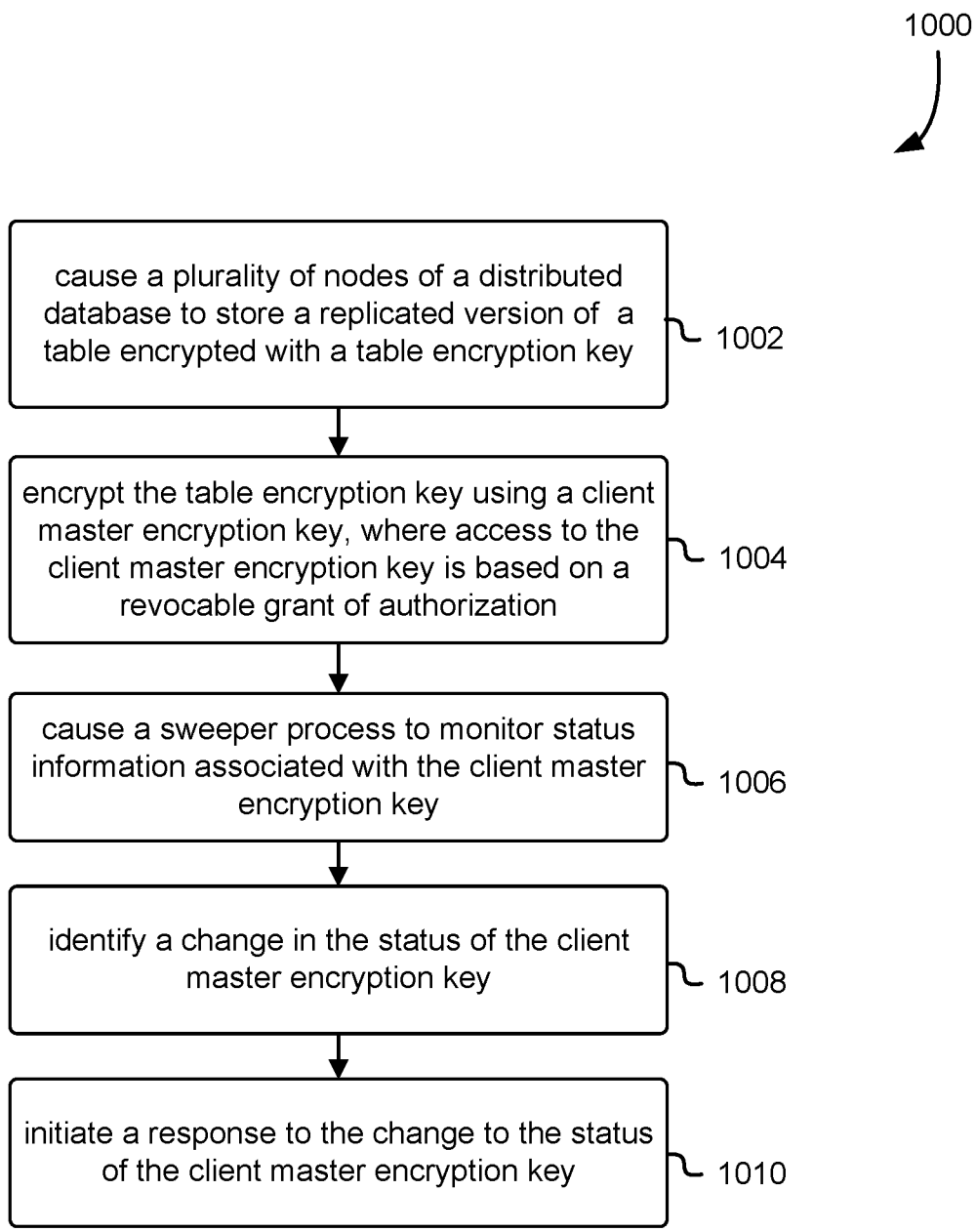
FIG. 10 illustrates an example process of encryption key status detection in a distributed database, in accordance with at least one embodiment.

FIG. 10 illustrates an example process of encryption key status detection in a distributed database, in accordance with at least one embodiment. The example process 1000 may be performed by any suitable computing system or combination of systems, including for example the distributed databases depicted in FIGS. 1 and 12.

Although FIG. 10 is depicted as a series of steps or operations, the depicted sequence should not be viewed as limiting the scope of the present disclosure to only those embodiments that conform to the depicted sequence. For example, in various embodiments, the depicted steps or operations may be altered, reordered, or omitted, except where explicitly stated or where logically required, such as when an input to one step or operation is obtained from an output of another step or operation.

At 1002, the distributed database causes a plurality of nodes of a distributed database to store a replicated version of a table encrypted with a table encryption key.

At 1004, the distributed database encrypts the table encryption key using a client master encryption key, where access to the client master encryption key is based on a revocable grant of authorization. The client may, for example, use a key management service, such as the service depicted in FIG. 1, to create the client master encryption key and to authorize the distributed database to use the client master encryption key.

At 1006, the distributed database cause a sweeper process to monitor status information associated with the client master encryption key. The sweeper process may, for example, iteratively examine each encrypted table, identify the corresponding client master encryption key, and use the key management service to check the status of the key. Various other mechanisms may also be used to discover changes to key status, as is explained in relation to FIG. 2.

At 1008, the distributed database identifies a change in the status of the client master encryption key, based on the operations of 1006. For example, the distributed database might receive a notification via an event bus that is indicative of the change in the status of the master encryption key. In another example, the sweeper process or a background process associated with the distributed database system might identify the change in the status of the client master encryption key.

At 1010, the distributed database initiate a response to the change to the status of the client master encryption key. For example, if the change in status corresponds to a revocation of the authorization to access the master encryption key, or an expiration of the client master encryption key, the distributed database may update metadata associated with the encrypted table to indicate a pending discontinuation of an operational state for access to the encrypted table. In another example, the change in status may correspond to a restoration of the authorization to access the client master encryption key. In that case, the distributed database may update metadata associated with the encrypted table to indicate an operational state for access to the encrypted table. The updates to the metadata may be performed, for example, based on a request initiated by a control plane and sent to the respective storage nodes. However, in at least one embodiment, a control plane update a repository of metadata shared by the storage nodes, and by other components of the distributed database.

Figure 11:
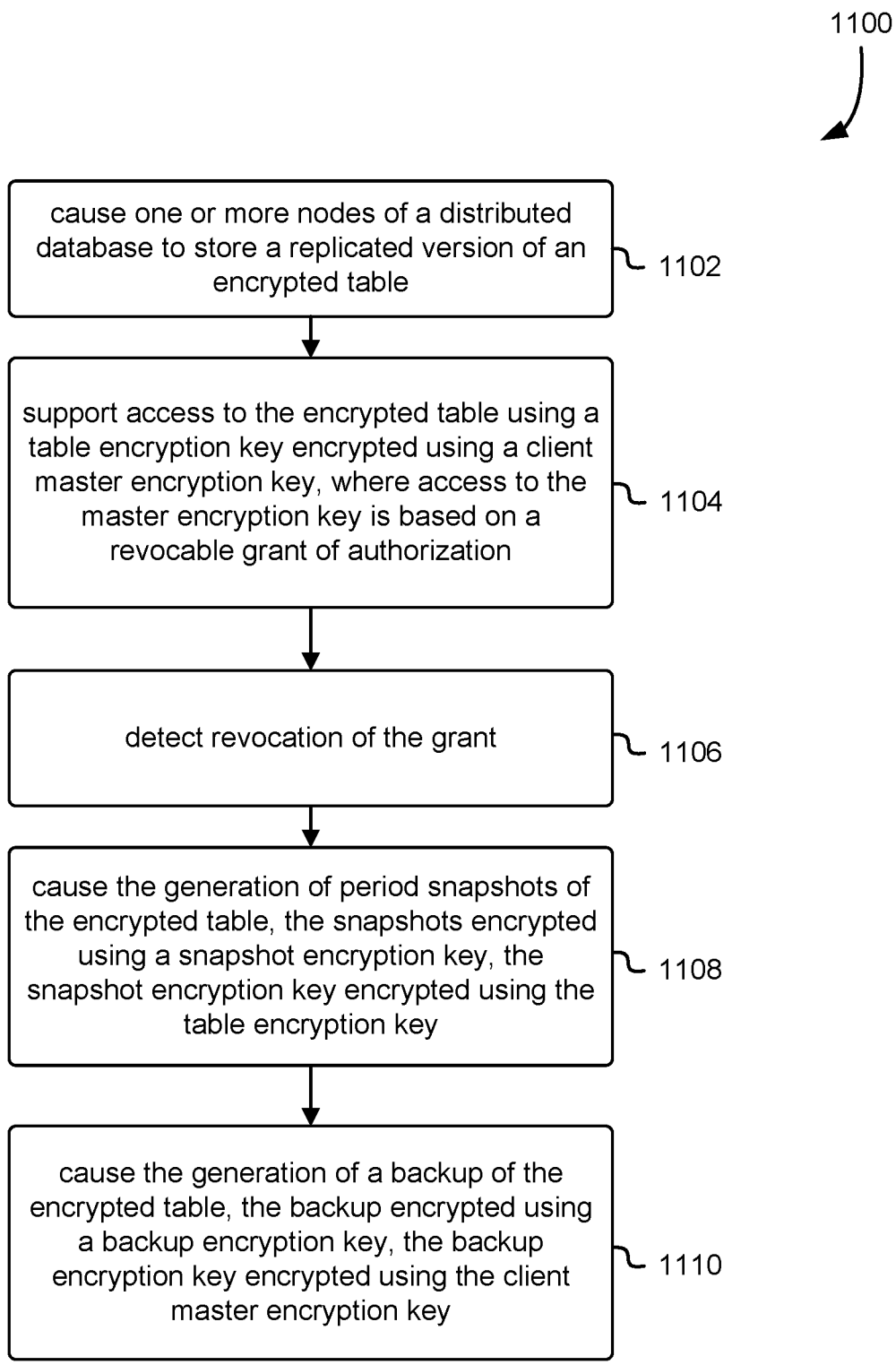
FIG. 11 illustrates an example process of snapshot and backup generation in a distributed database, in accordance with at least one embodiment.

FIG. 11 illustrates an example process of snapshot and backup generation in a distributed database, in accordance with at least one embodiment. The example process 1100 may be performed by any suitable computing system or combination of systems, including for example the distributed databases depicted in FIGS. 1 and 12.

Although FIG. 11 is depicted as a series of steps or operations, the depicted sequence should not be viewed as limiting the scope of the present disclosure to only those embodiments that conform to the depicted sequence. For example, in various embodiments, the depicted steps or operations may be altered, reordered, or omitted, except where explicitly stated or where logically required, such as when an input to one step or operation is obtained from an output of another step or operation.

At 1102, the distributed database causes one or more nodes of a distributed database to store a replicated version of an encrypted table.

At 1104, the distributed database supports access to the encrypted table using a table encryption key that is encrypted using a client master encryption key, and where access to the master encryption key is based on a revocable grant of authorization.

At 1106, the distributed database detects revocation of the grant, as described herein.

At 1108, the distributed database causes the generation of periodic snapshots of the encrypted table, where the snapshots are encrypted using a snapshot encryption key. The snapshot encryption key is encrypted using the table encryption key. Note that here, the snapshot is treated as a short-term copy of the table's data. For example, the snapshot may be intended for use in restoring the table's data to a node following an operational failure. As such, it is considered to be a short-lived artifact for which use of the table-key is appropriate. A snapshot is therefore considered to be distinct from a backup, which is intended to be usable by the client at any time subsequent to its creation, including substantially long periods of time from its creation.

At 1110, the distributed database causes the generation of a backup of the encrypted table. The backup is encrypted using an encryption key, which may be referred to as a backup encryption key, which is encrypted using the client master encryption key. The use of the client master encryption key as the parent of the backup encryption key, rather than using the table encryption key as the parent, allows the backup to be used by the client at any subsequent time, even after a table key may have expired or after the client has revoked authorization to access the client master encryption key. The client may, even after such revocation, retain access to the client master encryption key, and may therefore use the client master encryption key to access the backup.

In at least one embodiment, a snapshot is generated according to the technique just described, and is used to restore the encrypted table to a storage node during an interim period that is subsequent to the revocation of the authorization to access the master encryption key, and before the table is deactivated in response to the revocation.

In at least one embodiment, a backup—as distinguished from a snapshot—is generated in response to a request by a client of the distributed database. Alternatively, a backup may be generated automatically as part of the table's deactivation process, subsequent to the revocation of authority to access the client master encryption key. In at least one embodiment, the distributed database obtains authorization for a temporary extension to the revocation of the authorization to access the master encryption key, and uses the temporary extension to generate and store the backup of the encrypted table.

If a table is deactivated, the distributed database may, in at least one embodiment, restore the encrypted table using the backup and a restored authorization to access the master encryption key. In some cases, the restored authorization may be temporary, e.g., for the purpose of using the backup to restore the encrypted table.

In the period subsequent to the revocation of authorization to access the client master encryption key, a deactivation process may be initiated for the table. This process may comprise updated table metadata to indicate the pending activation of the table, initiating notification of the pending deactivation, allowing a first threshold period of time to elapse, turning off replication of the table, allowing a second threshold period of time to elapse, generating a backup of the table, and then deactivating or deleting the table.

Figure 12:
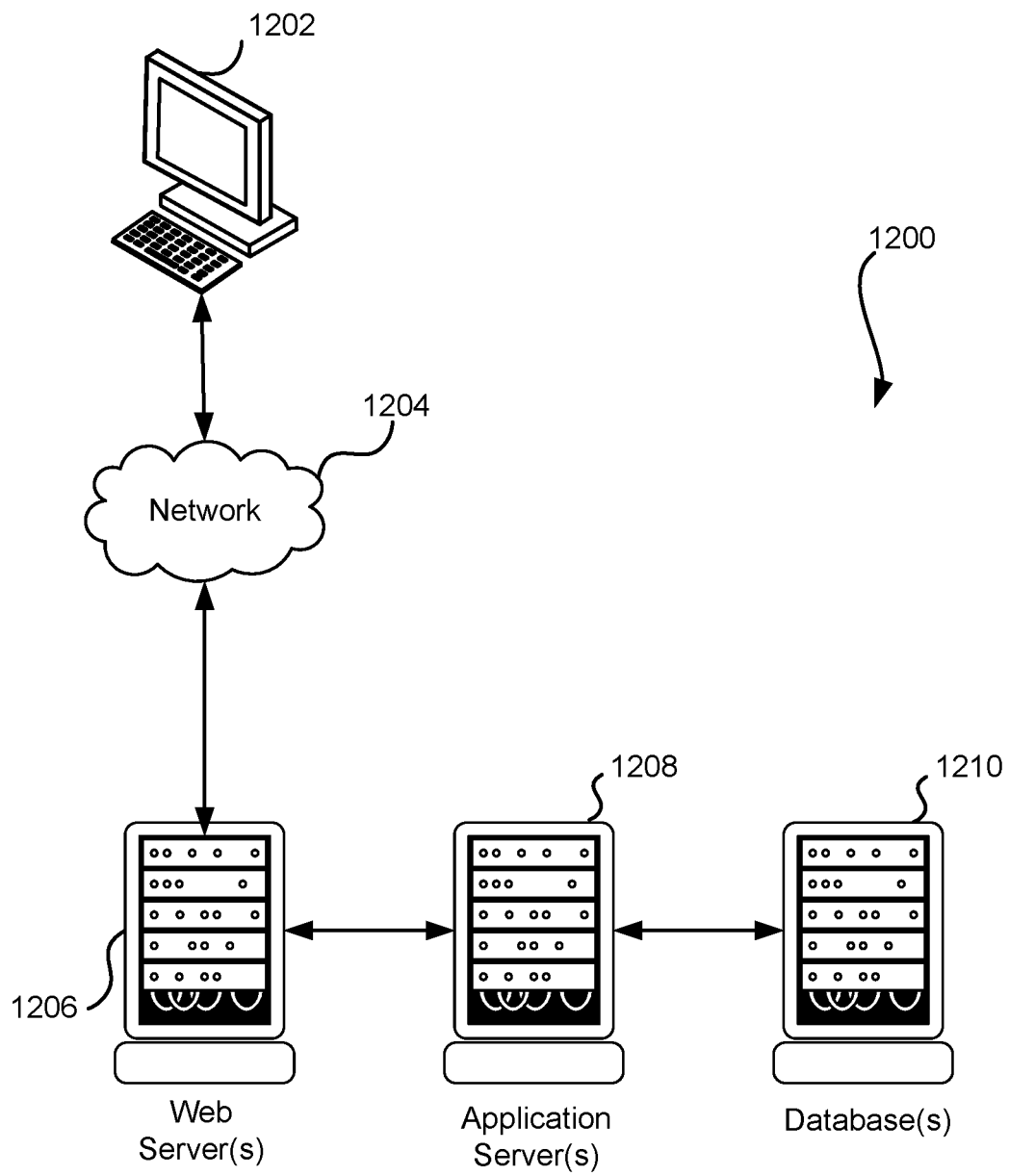
FIG. 12 illustrates an example of a system in which various embodiments can be implemented.

FIG. 12 illustrates an example of a system in which various embodiments can be implemented. As will be appreciated, although a web-based system is used for purposes of explanation, different systems may be used, as appropriate, to implement various embodiments. In an embodiment, the system includes an electronic client device 1202, which includes any appropriate device operable to send and/or receive requests, messages, or information over an appropriate network 1204 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 1206 for receiving requests and serving content in response thereto, although for other networks an alternative device serving a similar purpose could be used as would be apparent to one of ordinary skill in the art.

In an embodiment, the illustrative system includes at least one application server 1208 and a database 1210, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 1202 and the application server 1208, in an embodiment, is handled by the web server using PUP: Hypertext Preprocessor ("PUP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The database 1210, in an embodiment, includes several separate data tables, databases, data documents, dynamic data storage schemes and/or other data storage mechanisms and media for storing data relating to a particular aspect of the present disclosure. The database 1210, in an embodiment, is operable, through logic associated therewith, to receive instructions from the application server 1208 and obtain, update or otherwise process data in response thereto, and the application server 1208 provides static, dynamic, or a combination of static and dynamic data in response to the received instructions.

In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 1202. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 1200 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 1200, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 12. Thus, the depiction of the system 1200 in FIG. 12 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization, and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java©, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the subject matter set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the subject matter recited by the claims to the specific form or forms disclosed but, on the contrary, the intention is to cover all modifications, alternative constructions, and equivalents falling within the spirit and scope of this disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate various embodiments and does not pose a limitation on the scope of the claims unless otherwise claimed. No language in the specification should be construed as indicating any non-claimed element as essential to the practice of inventive subject material disclosed herein.

Embodiments of this disclosure are described herein, including the best mode known to the inventors for carrying out inventive concepts described herein. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A distributed database system, comprising:
at least one processor; and
a memory comprising executable instructions that, in response to execution by the at least one processor, cause the distributed database system to at least:
cause a plurality of nodes of a distributed database to store a replicated version of an encrypted table, the encrypted table accessible using a table encryption key generated using a master encryption key, wherein access to the master encryption key is based at least in part on authorization to access the master encryption key granted by a client of the distributed database;
cause a sweeper process to monitor status information associated with the master encryption key, wherein the sweeper process examines metadata of each encrypted table of a plurality of encrypted tables maintained by the distributed database to identify the plurality of encrypted tables and respective master encryption key status of encryption keys associated with the plurality of encrypted tables maintained by the distributed database, wherein the examination by the sweeper process is based at least in part on the metadata maintained by the distributed database system, wherein the metadata comprises information associated with each of the plurality of encrypted tables and is indicative of a change in a status of the master encryption key;
detect, using the sweeper process, the change in the status of the master encryption key used to generate the table encryption key; and
initiate a response to the change in the status of the master encryption key, wherein the response maintains access to the encrypted table for a threshold period of time after the change in the status of the master encryption key and indicates whether restoration of authorization to access the master encryption key has been granted by the client of the distributed database, wherein the metadata is updated based at least in part on the response.

2. The distributed database system of claim 1, the memory comprising executable instructions that, in response to execution by the at least one processor, cause the distributed database system to at least:
receive, from an event bus, information indicative of the change in the status of the master encryption key.

3. The distributed database system of claim 1, the memory comprising executable instructions that, in response to execution by the at least one processor, cause the distributed database system to at least:
receive, by operation of a process associated with the distributed database system, information indicative of the change in the status of the master encryption key.

4. The distributed database system of claim 1, the memory comprising executable instructions that, in response to execution by the at least one processor, cause the distributed database system to at least:
determine that the change in status corresponds to a revocation of the authorization to access the master encryption key; and
update metadata associated with the encrypted table to indicate a pending discontinuation of an operational state for access to the encrypted table.

5. The distributed database system of claim 1, the memory comprising executable instructions that, in response to execution by the at least one processor, cause the distributed database system to at least:
determine that the change in status corresponds to a restoration of the authorization to access the master encryption key; and
update metadata associated with the encrypted table to indicate an operational state for access to the encrypted table.

6. A method, comprising:
storing, by a plurality of nodes of a distributed database, a replicated version of an encrypted table, the encrypted table accessible using a table encryption key encrypted by a master encryption key, wherein access to the master encryption key is based at least in part on authorization to access the master encryption key granted by a client of the distributed database;
monitoring status information associated with the master encryption key, wherein the monitoring comprises a sweeper process examining metadata maintained by the distributed database to identify a plurality of encrypted tables and respective master encryption key status of the plurality of encrypted tables maintained by the distributed database, wherein the examination by the sweeper process is based at least in part on the metadata maintained by the distributed database, wherein the metadata describes each of the plurality of encrypted tables and comprises information indicative of identity and status of the master encryption key;
identifying a change in a status of the master encryption key used to generate the table encryption key; and
responding to the change in the status of the master encryption key, wherein the response to the change maintains access to the encrypted table for a threshold period of time after the change in the status of the master encryption key and indicates whether restoration of authorization to access the master encryption key has been granted by the client of the distributed database, wherein the metadata is updated based at least in part on the response.

7. The method of claim 6, further comprising:
receiving, from an event bus, information indicative of the change in the status of the master encryption key.

8. The method of claim 6, further comprising:
receiving, from at least one of a storage, retrieval, or maintenance operation of the distributed database, information indicative of the change in the status of the master encryption key.

9. The method of claim 6, wherein the sweeper process iteratively obtains status of master encryption keys from a key management service.

10. The method of claim 9, wherein the change in status corresponds to expiration of the master encryption key.

11. The method of claim 9, further comprising:
updating metadata associated with the encrypted table to indicate a pending discontinuation of an operational state for access to the encrypted table.

12. The method of claim 6, wherein the change in status corresponds to restoration of the authorization to access the master encryption key.

13. The method of claim 12, further comprising:
updating metadata associated with the encrypted table to indicate an operational state of the encrypted table.

14. A non-transitory computer-readable storage medium having stored thereon executable instructions that, in response to being executed by one or more processors of a computing device, cause the computing device to at least:
store, by a plurality of nodes of a distributed database, a replicated version of an encrypted table, the encrypted table accessible using a table encryption key encrypted by a master encryption key, wherein access to the master encryption key is based at least in part on authorization to access the master encryption key granted by a client of the distributed database;
monitor status information associated with the master encryption key, wherein the monitoring comprises a sweeper process examining metadata maintained by the distributed database to identify a plurality of encrypted tables and status information for respective master encryption keys associated with the plurality of encrypted tables maintained by the distributed database, wherein the examination by the sweeper process uses the metadata maintained by the distributed database, wherein the metadata comprises information associated with each of the plurality of encrypted tables and is indicative of a change in a status of the master encryption key;
identify the change in the status of the master encryption key used to generate the table encryption key; and
respond to the change in the status of the master encryption key, wherein the response to the change maintains access to the encrypted table for a threshold period of time after the change in the status of the master encryption key and indicates whether restoration of authorization to access the master encryption key has been granted by the client of the distributed database, wherein the metadata is updated based at least in part on the response.

15. The non-transitory computer-readable storage medium of claim 14, having stored thereon further executable instructions that, in response to being executed by one or more processors, cause the computing device to at least:
receive, from an event bus, information indicative of the change in the status of the master encryption key.

16. The non-transitory computer-readable storage medium of claim 14, having stored thereon further executable instructions that, in response to being executed by one or more processors, cause the computing device to at least:
receive, from at least one of a storage, retrieval, or maintenance operation associated with the distributed database, information indicative of the change in the status of the master encryption key.

17. The non-transitory computer-readable storage medium of claim 14, wherein the sweeper process obtains status information for a master encryption key from a key management service.

18. The non-transitory computer-readable storage medium of claim 14, having stored thereon further executable instructions that, in response to being executed by one or more processors, cause the computing device to at least:
store metadata associated with the encrypted table to indicate a pending discontinuation of an operational state for access to the encrypted table.

19. The non-transitory computer-readable storage medium of claim 14, wherein the change in status corresponds to restoration of the authorization to access the master encryption key.

20. The non-transitory computer-readable storage medium of claim 19, having stored thereon further executable instructions that, in response to being executed by one or more processors, cause the computing device to at least:
store metadata associated with the encrypted table to indicate an operational state of the encrypted table.

* * * * *